United States Patent [19]

Walther et al.

[11] Patent Number: 4,832,425
[45] Date of Patent: May 23, 1989

[54] ROTATION SYSTEM FOR A ROTATING, TILTING REFLECTOR

[75] Inventors: Gerd-Jürgen Walther; Herbert Wech, both of Ulm; Heinz-Georg Wippich, Senden, all of Fed. Rep. of Germany

[73] Assignee: Licentia Patent-Verwaltungs-GmbH, Frankfurt, Fed. Rep. of Germany

[21] Appl. No.: 57,899

[22] PCT Filed: Sep. 20, 1986

[86] PCT No.: PCT/EP86/00550
§ 371 Date: Jul. 16, 1987
§ 102(e) Date: Jul. 16, 1987

[87] PCT Pub. No.: WO87/02148
PCT Pub. Date: Apr. 9, 1987

[30] Foreign Application Priority Data

Sep. 26, 1985 [DE] Fed. Rep. of Germany ... 8527426[U]
Apr. 16, 1986 [DE] Fed. Rep. of Germany ....... 3612751

[51] Int. Cl.$^4$ .......................... G02B 26/10; G02B 7/18
[52] U.S. Cl. ........................................ 350/6.5; 350/6.9; 250/235
[58] Field of Search ................... 350/6.5, 6.6, 6.7, 6.8, 350/486, 500, 632, 633, 636, 6.9; 356/401, 400; 250/235

[56] References Cited

U.S. PATENT DOCUMENTS

| | | | |
|---|---|---|---|
| 3,951,510 | 4/1976 | Lloyd | 350/500 |
| 4,149,777 | 4/1979 | Bunch | 350/486 |
| 4,155,620 | 5/1979 | Rawson | 350/6.6 |
| 4,295,621 | 10/1981 | Siryj | |
| 4,379,624 | 4/1983 | Miller et al. | 350/486 |
| 4,439,003 | 3/1984 | Roth | 350/6.6 |
| 4,626,063 | 12/1986 | Honey | 350/6.9 |

FOREIGN PATENT DOCUMENTS

| | | | |
|---|---|---|---|
| 140551 | 5/1985 | European Pat. Off. | |
| 3237484 | 4/1984 | Fed. Rep. of Germany | |
| 1290231 | 2/1987 | U.S.S.R. | 350/6.5 |

Primary Examiner—John K. Corbin
Assistant Examiner—Loha Ben
Attorney, Agent, or Firm—Spencer & Frank

[57] ABSTRACT

A shift mirror or reflector (SP) which is noted by high azimuth velocity around a first axis (A1) and dependent upon that can be tilted around an axis rotating therewith. The rotary movement is transmitted from a motor (M) arranged at the side by means of a belt drive (RS) (Z1) or directly from a coaxial hollow shaft motor (M1) via a first shaft and a reflector-suspension to the reflector. The tilt movement arises from an up and down movement of a second shaft via tilt levers (K1, K2), with the second shaft being guided within the first shaft and rotating therewith. The second shaft (A2) is coupled via an axial bearing to the up and down movement of a spindle/nut arrangement, which is actuated by a separate drive (RS2) or another hollow shaft motor (M2). First shaft, second shaft, spindle, nut and also, if desired, the hollow shaft motors are arranged coaxial to each other.

9 Claims, 2 Drawing Sheets

ROTATION SYSTEM FOR A ROTATING, TILTING REFLECTOR

BACKGROUND OF THE INVENTION

The invention relates to a rotation system for a rotating, tilting reflector.

An arrangement of this type is already disclosed in DE-OS No. 32 37 484, wherein an adjusting block can be moved by means of a spindle parallel to the axis of a rotating shaft. On the shaft is arranged a sleeve which rotates therewith, and which is displaced together with the shaft by the adjusting block and converts the axial displcement via a tilting reflector into a tilting motion for a mirror or radar lever.

SUMMARY OF THE INVENTION

The object of the present invention is to provide a rotation system for a rotating, tilting reflector, which requires as small a space as possible.

The above object is achieved according to the present invention by a rotation system for a rotating tilting mirror or reflector which rotates around a first axis and a simultaneously can be tilted around a second axis which rotates with the first axis and is arranged perpendicular to the first axis, with the system including a first shaft rotatable relative to a stationary housing and mounted in the housing, and a device which is axially movable relative to the housing by means of a spindle, and which is connected via a tilt level with a support plate which supports the reflector and which is rotatable around the second axis; and wherein: the first shaft is hollow; the axially movable device which rotates therewith is configured as a second shaft arranged inside the first shaft; the spindle is rotatably mounted in the housing coaxial to the first and second shafts; an axially movable nut, which is rotationally fixed, is mounted on the spindle; and the nut and the second shaft are coupled via an axial bearing in their axial displacement.

BRIEF DESCRIPTION OF THE DRAWINGS

The invention is shown in detail hereinafter relative to the drawings, showing advantageous embodiments.

DESCRIPTION OF THE INVENTION

Figure 1:
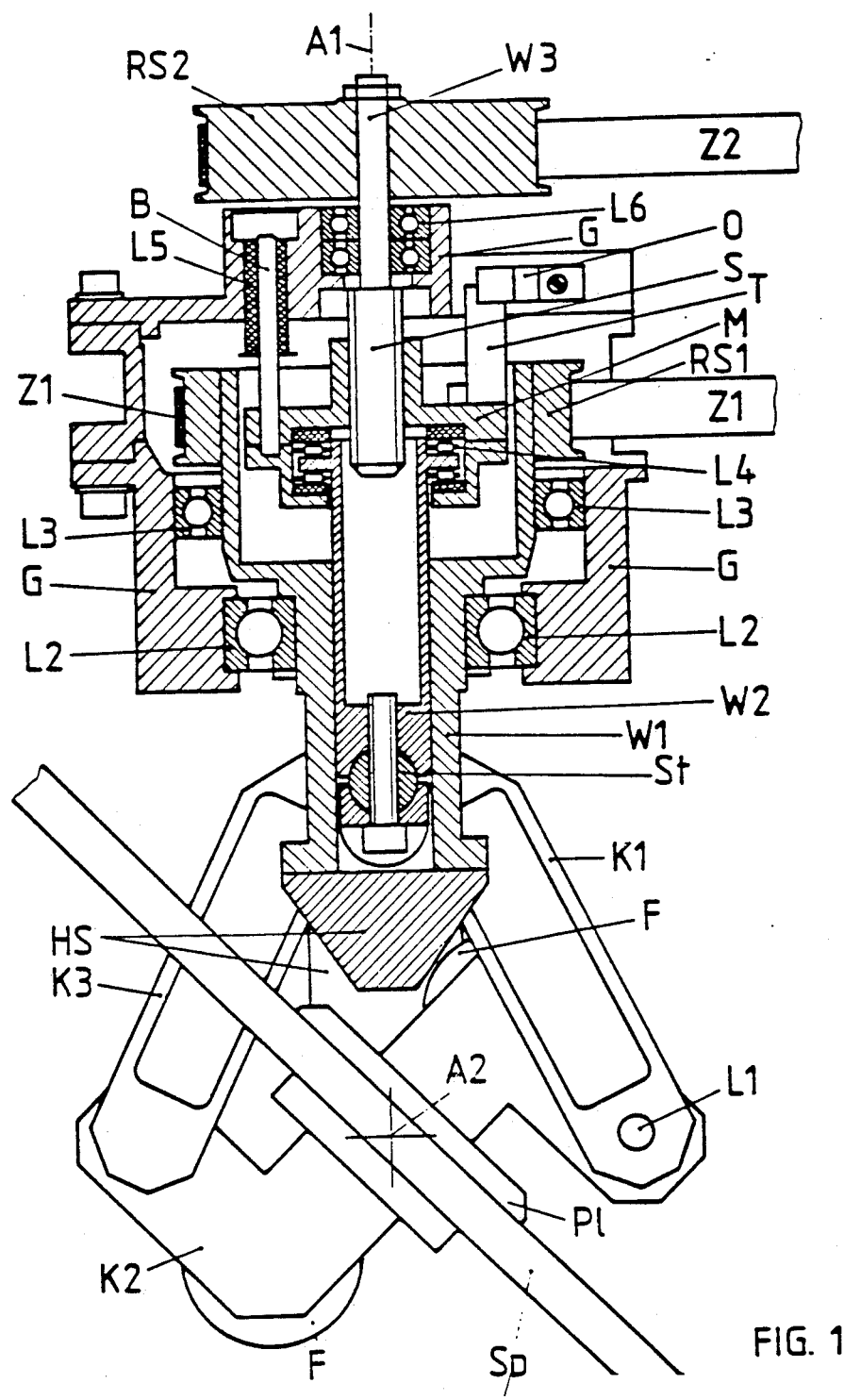
FIG. 1 is a sectional view of a rotation system of the present invention.

The reflector Sp is mounted on a support plate P1 and can be tilted around an axis A2 perpendicular to the plane of the drawing. The tilting movement of the reflector Sp is obtained by an up and down movement of the attachment of the rocker arm K1, which is tightly connected via a pivot point L1 with the double bent or dogleg lever K2 which is connected with support plate P1. Lever K2 also carries compensation weights F as a counterbalance for the rotating reflector. Lever K3 is not connected with lever K2, but rather only sliding on it.

Reflector Sp is connected with support plate P1 and lever K2 via the reflector suspension HS which introduces the rotary movement, and is mounted rotatably via bearing L2, L3 in a stationary housing G.

In the embodiment shown in FIG. 1, the shaft W1 supports a grooved belt pulley RS1, which causes the rotation by means of the grooved belt Z1. inside the hollow shaft W1 is arranged a second shaft W2 which can slide axially. Shaft W2 is connected at its bottom end with a post St, which is carried through lengthwise holes in the first shaft and which forms the suspension for the rocker arm.

The second shaft W2 is coupled via an axial bearing L4 with an axially movable device and thus executes its axial displacement. This device consists essentially of a nut M, which engages an external thread on a rotatable spindle S and which is prevented from twisting or rotating by one or more bolts B acting as a torque support. The bolt B which is shown is connected tightly with the nut M and is mounted to be axially movably in a bearing L5 in the housing G.

With rotation of spindle S, which is connected with another grooved belt pulley RS2 through a third shaft W3 mounted rotatably in a bearing L6 disposed in the housing G, the nut M, which is not capable of rotating is moved up or down according to the direction of rotation of the spindle S and thus carries second shaft W2 with it. The axial displacement of shaft W2 is converted via the post St and levers K1, K2 into a tilting movement of reflector Sp around axis A2. Shaft W1 is widened in its top part, so that the up and down movement of the nut M together with the axial bearing L4 takes place in the free space which is thus acquired. Furthermore, shaft W2 is also hollow at the top, so that the spindle S can fit into shaft W2. Thus the system can be of quite low structure. The M also carries an index mark T, which, in cooperation with an optical sensor O fastened to the housing, can form a light barrier for approximate monitoring of the setting of the spindle.

Figure 2:
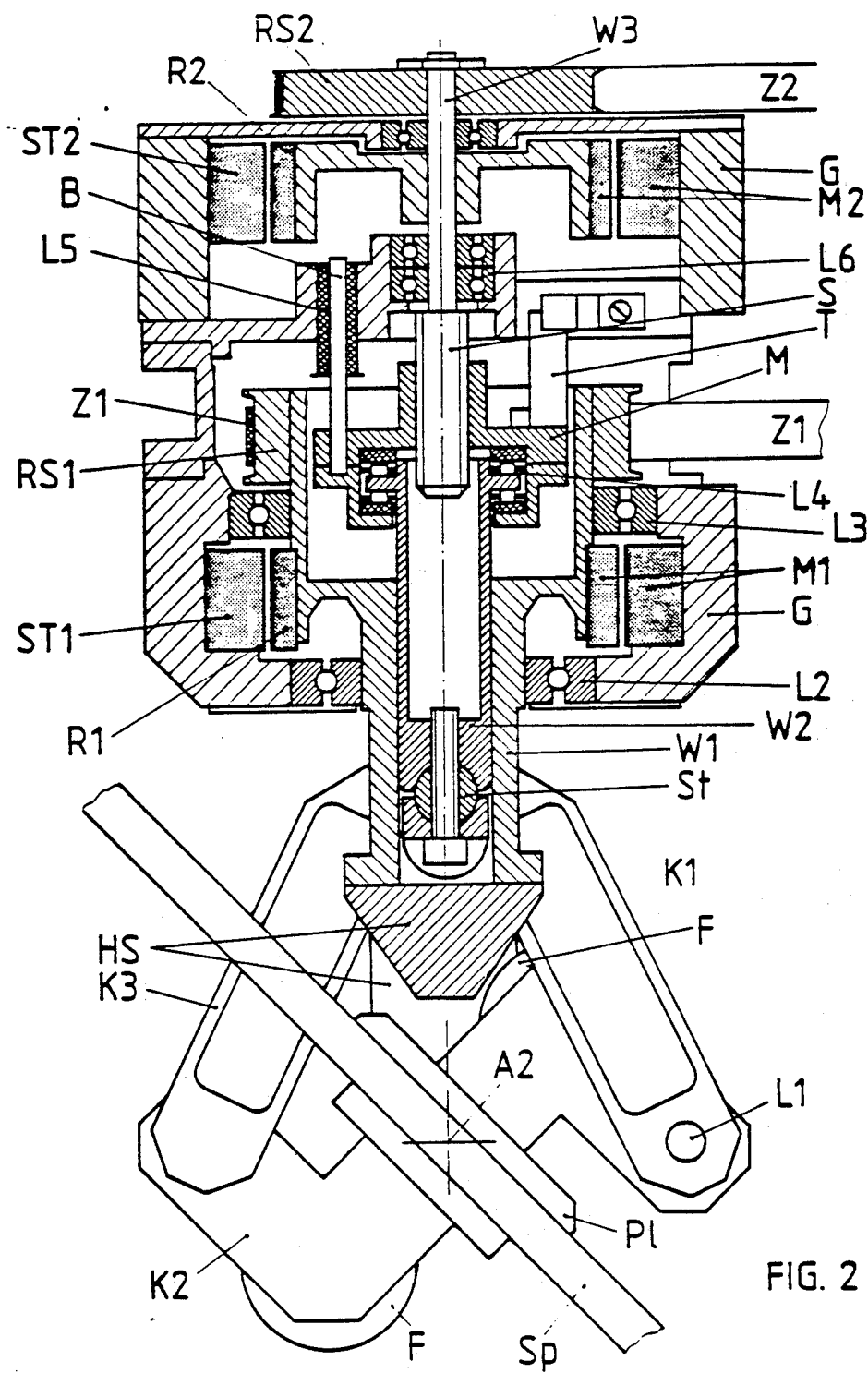
FIG. 2 is a sectional view of an alternative embodiment of the present invention.

The preferred embodiment of FIG. 2 differs from the previously described arrangement essentially in that first shaft W1 and spindle S are not driven by motors arranged outside housing G by means of grooved belts Z1 and Z2, but rather are driven by integrated hollow shaft motors M1 and M2 arranged in the housing coaxial to the first shaft W1 and spindle S, respectively. Rotor R1 of the first hollow shaft motor M1 is connected tightly with the first shaft W1, and stator ST1 is connected with the housing G. The rotor R2 of the second hollow shaft motor M2 is connected tightly with the third shaft W3 and through this with spindle S, which the stator ST2 is in turn fastened in housing G. Belt pulleys RS1 and RS2 with grooved belts Z1 and Z2 now no longer serve for transmission of the drive power force, but measure the rotation of the first shaft W1 or spindle S on angle indicators arranged outside the housing. Instead of having the angle indicators lying outside, hollow shaft angle indicators could also be provided coaxial to the first shaft and the spindle. The hollow shaft motors are preferably configured as brushless direct current motors.

The arrangement in FIG. 2 agrees in the other parts with the arrangement of FIG. 1 and also has the same reference-numerals, so that reference is made herein to the description of FIG. 1.

The invention shown, in a slightly modified form is also for use with an arrangement in which instead of tilting, axial displacement of a rotating reflector can be undertaken. In such case, instead of the levers K1, K2, K3, a reflector suspension and positioning arrangement, which allows an axial movement is provided.

We claim:

1. In a rotation system for a rotating tilting reflector, comprising a reflector, and means for mounting said reflector for rotation about a first axis and simultaneously for tilting said reflector around a second axis which rotates with and is arranged perpendicular to said first axis, said means for mounting including a first shaft mounted in a stationary housing for rotation relative to said stationary housing about said first axis, a device mounted for axial movement relative to said stationary housing along said first axis, means for axially moving said device, and a tilt lever connecting said device to a support plate for supporting said reflector, with said support plate being mounted on said first shaft for rotation around said second axis; the improvement wherein: said first shaft is hollow; said axially movable device includes a second shaft positioned inside said hollow first shaft and rotating therewith; and said means for axially moving said device includes a rotatable externally threaded spindle mounted in said housing and positioned coaxial to said first and said second shafts, a nut threadingly engages said spindle, means for preventing rotation while permitting axial movement of said nut relative to said spindle upon rotation of said spindle, and an axial bearing coupling said nut and said second shaft.

2. Arrangement as in claim 1, wherein said means for preventing rotation includes at least one bolt connected to said nut, and mounted to be axially slidable in the stationary housing.

3. Arrangement as in claim 2, wherein said rotatable spindle and the first shaft are driven by respective belt drives.

4. Arrangement as in claim 2, wherein the spindle and the first shaft are individually separately driven by co-axial hollow shaft motor.

5. Arrangement as in claim 1, wherein said rotatable spindle and the first shaft are driven by respective belt drives.

6. Arrangement as in claim 1 wherein the spindle and the first shaft are individually separately driven by co-axial hollow shaft motor.

7. Arrangement as in claim 6 wherein angle positions of the first shaft and the reflector are each transmitted over a belt drive to angle indicators located on the side of the housing.

8. Arrangement as in claim 6, wherein coaxially hollow shaft-angle indicators are provided for determining angle positions of the reflector and the first shaft.

9. Apparatus as defined in claim 1 wherein said second shaft is hollow at its end facing said spindle.

* * * * *